(12) United States Patent
Im et al.

(10) Patent No.: US 7,272,868 B2
(45) Date of Patent: Sep. 25, 2007

(54) ROBOT CLEANER AND METHOD FOR OPERATING THE SAME

(75) Inventors: Hyoung-Bin Im, Gyeonggi-Do (KR); Hyeong-Shin Jeon, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 551 days.

(21) Appl. No.: 10/837,660

(22) Filed: May 4, 2004

(65) Prior Publication Data
US 2005/0132522 A1    Jun. 23, 2005

(30) Foreign Application Priority Data
Dec. 22, 2003   (KR) .................. 10-2003-0094958

(51) Int. Cl.
*A47L 9/28* (2006.01)
(52) U.S. Cl. .................... 15/319; 15/340.1
(58) Field of Classification Search .............. 15/319, 15/340.1, 340.3, 359, 362, 357, 358
See application file for complete search history.

(56) References Cited

U.S. PATENT DOCUMENTS

| 4,977,639 A * | 12/1990 | Takahashi et al. ........... 15/319 |
| 5,109,566 A | 5/1992 | Kobayashi et al. ........... 15/319 |
| 5,787,545 A | 8/1998 | Colens ........................ 15/319 |
| 2002/0116089 A1 | 8/2002 | Kirkpatrick, Jr. ........... 700/245 |
| 2003/0060928 A1 * | 3/2003 | Abramson et al. .......... 700/245 |
| 2004/0143927 A1 * | 7/2004 | Haegermarck et al. ....... 15/319 |

FOREIGN PATENT DOCUMENTS

| JP | 01-207806 | 8/1989 |
| KR | 1993 0010425 | 10/1993 |
| KR | 2000 0002315 | 1/2000 |
| WO | 02/065886 | 8/2002 |

OTHER PUBLICATIONS

English language Abstract of KOREA 2000-0002315.
English language Abstract of KOREA 1993-0010425.
English language Abstract of JP 01-207806.

* cited by examiner

Primary Examiner—Theresa T. Snider
(74) Attorney, Agent, or Firm—Greenblum & Bernstein, P.L.C.

(57) ABSTRACT

A robot cleaner includes a suction device installed within a cleaner body, that sucks dirt on a floor; a driver that moves the cleaner body; a detector mounted at the cleaner body, that detects a height between a bottom of the cleaner body and the floor; and a controller that controls the suction device in response to signal from the detector to adjust a suction force of the suction device in accordance with the height between the bottom of the cleaner body and the floor.

12 Claims, 4 Drawing Sheets

US 7,272,868 B2

ROBOT CLEANER AND METHOD FOR OPERATING THE SAME

BACKGROUND OF THE INVENTION

1. Field of the Invention

The present invention relates to a robot cleaner and its operating method, and more particularly, to a robot cleaner and its operating method capable of improving cleaning efficiency by controlling a suction force according to a height between a cleaner and a floor.

2. Description of the Background Art

In general, a robot cleaner is a machine that detects a cleaning zone by itself, an obstacle or the like without operation of a user, cleans while moving by itself, moves to a charging station by itself when power of a battery is consumed, to be charged, and returns to a cleaning zone when the charging is completed, to perform a cleaning operation.

Such a robot cleaner includes a suction unit for sucking dirt on a floor; a driving wheel connected to a driving motor to make the robot cleaner travel; a navigation sensor for determining a position of a cleaner and a position of an obstacle or the like; and a control unit for automatically controlling the cleaner. The robot cleaner performs a cleaning operation, moving along a preset pattern, and an encoder connected to the driving wheel senses a rotation state of the driving wheel, to thereby determine a traveling state of the cleaner.

However, the conventional robot cleaner has following problems.

The conventional robot cleaner sucks dirt with the same suction force during cleaning operation. For this reason, dirt cannot be properly sucked at a concaved portion where a height between a bottom of a cleaner and itself is relatively high. Also, excessive suction force, which is stronger than a required suction force is applied to a convexed portion where a height between a bottom of the cleaner and itself is relatively low, thereby causing deterioration in efficiency of a cleaner.

SUMMARY OF THE INVENTION

Therefore, an object of the present invention is to provide a robot cleaner and its operating method capable of improving cleaning efficiency by controlling a suction force for sucking dirt on a floor according to a height between a cleaner and a floor.

To achieve these and other advantages and in accordance with the purpose of the present invention, as embodied and broadly described herein, there is provided a robot cleaner comprising a suction unit installed within a cleaner body, for sucking dirt on a floor; a driving unit for moving the cleaner body; a detecting unit mounted at the cleaner body, for detecting a height between a bottom of the cleaner body and a floor; and a control unit controlling the suction unit in response to signal from the detecting unit, for adjusting a suction force of the suction unit in accordance with the height between the bottom of the cleaner body and the floor.

To achieve these and other advantages and in accordance with the purpose of the present invention, as embodied and broadly described herein, there is provided an operating method of a robot cleaner comprising a first step of carrying out cleaning operation by moving by itself and sucking dirt on a floor; a second step of detecting a height between a bottom of the cleaner and a floor; and a third step of controlling a suction force for sucking dirt on the floor in accordance with the height between the bottom of the cleaner and a floor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
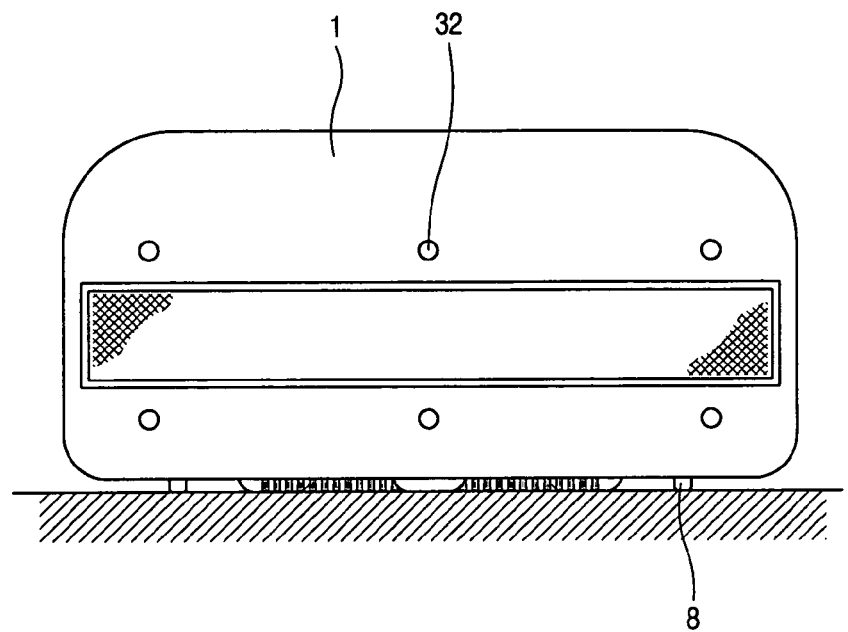
FIG. 1 is a view showing a front side of a robot cleaner in accordance with the present invention.
Figure 2:
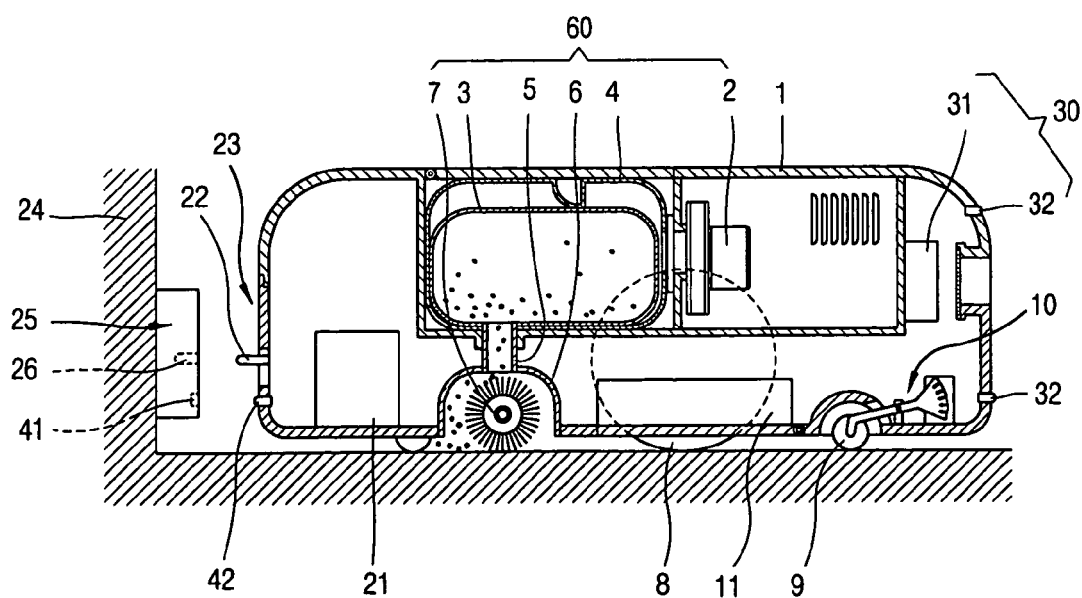
FIG. 2 is a sectional view showing a robot cleaner in accordance with the present invention.
Figure 3:
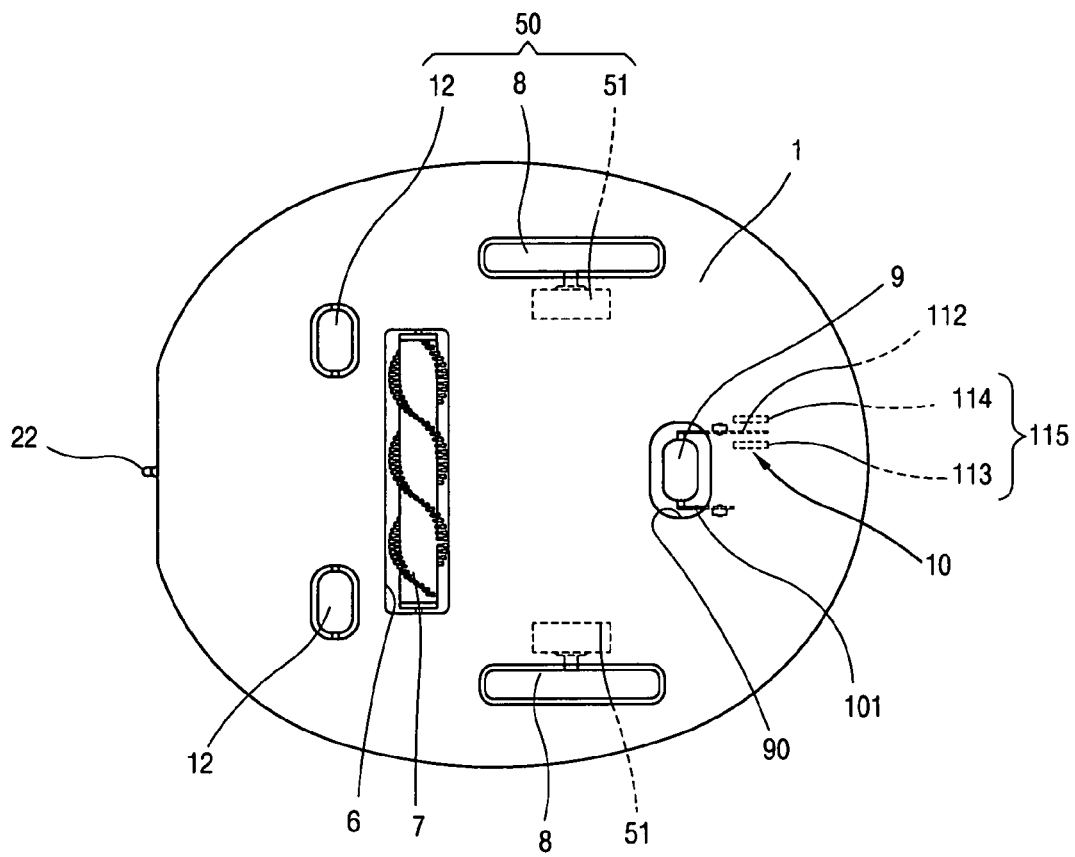
FIG. 3 is a view showing a bottom of a robot cleaner in accordance with the present invention.

As shown in FIGS. 1 through 3, a robot cleaner in accordance with the present invention, comprises a suction unit 60 installed within a cleaner body 1 for sucking dirt on a floor; a driving unit 50 for moving the cleaner body 1; at least one navigation sensor 30 installed at one side of the cleaner body 1 for sensing a position of an obstacle; a detecting unit 10 mounted at the cleaner body 1 for detecting a height between a bottom of the cleaner body 1 and a floor; and a control unit 11 controlling each of the mentioned components and controlling the suction unit 60 in response to signal from the detecting unit 10, thus adjusting a suction force of the suction unit 10.

The suction unit 60 comprises a fan motor 2 installed inside the cleaner body 1 and generating a suction force for sucking dirt on a floor; a filter container 4 installed in the vicinity of the fan motor 2 and having a filter 3 for filtering dirt sucked by the fan motor 2; a suction head 6 through which dirt on a floor is sucked, the suction head 6 provided at a lower portion of the cleaner body 1 and connected to the filter container 4 through a connection pipe 5; and a brush 7 rotatably disposed in the suction head, for brushing dirt attached on a floor.

The driving unit 50 comprises a driving wheel 8 rotatably installed at the cleaner body 1; a driving motor 51 connected to the driving wheel 8, for rotating the driving wheel; and at least one supporting wheel 12 installed at a bottom of the cleaner body 1 to be rotated by movement of the cleaner body 1, for supporting the cleaner body 1 on a floor.

The navigation sensor 30 includes an ultrasonic wave transmitter 31 installed at a front and central portion in the cleaner body 1, for transmitting ultrasonic waves; and ultrasonic wave receiver 32 respectively installed at upper and lower sides of the ultrasonic transmitter 31, for receiving ultrasonic waves reflected by an obstacles and for outputting signals to the control unit 11.

Figure 4:
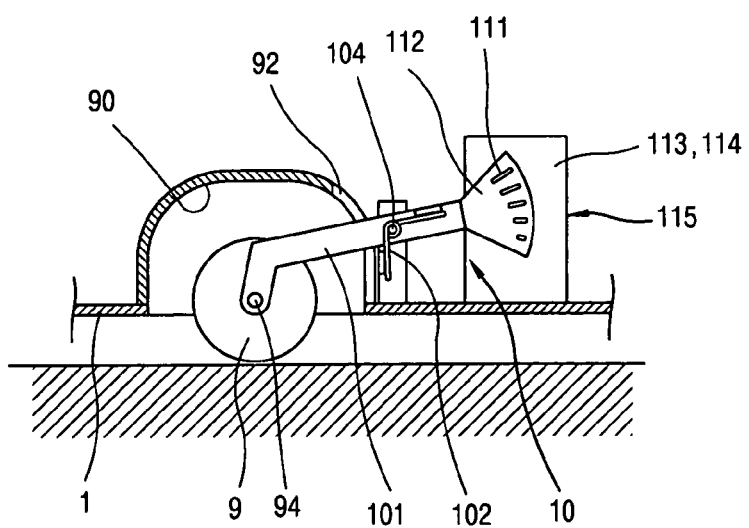
FIG. 4 is a partially sectional view showing a detecting unit provided in a robot cleaner in accordance with the present invention.

As shown in FIG. 4, the detecting unit 10 comprises an auxiliary wheel 9 formed in a cylindrical shape, inserted into a recessed portion 90 in a bottom of the cleaner body 1 to be contacted with a floor, and rotated by movement of the cleaner body 1; a connecting link 101 hingedly connected to a hinge shaft 94 protruded from both ends of the auxiliary wheel 9, penetrating a through hole 92 in the recessed portion, and pivotally connected to a pivot shaft 104 fixed in the cleaner body 1; and a sensing unit disposed in the vicinity of one end of the connecting link 101, for sensing the amount of rotation of the connecting link 101 and measuring the amount of vertical displacement of the wheel.

The auxiliary wheel 9 and the connecting link 101 are displaced in a vertical direction according to unevenness of a floor by their weight. Herein, in order that the auxiliary wheel 9 and the connecting link 101 are smoothly moved, preferably, an elastic member 102 of which one end is fixed to the body 1 and another end is fixed to the connecting link 101 is provided so that a preset elastic force is applied to the connecting link 101 and the auxiliary wheel 9.

The elastic member 102 may be a coil spring, but is not limited thereto. Various forms such as a torsion bar or the like may be applied as the elastic member 102. By such an elastic member 102, the auxiliary wheel 9 is always in contact with a floor, and the cleaner body 1 maintains a horizontal state.

The sensing unit comprises a rotating plate 112 installed at an end of the connecting link 101 and has a plurality of slits 111 having different shapes from each other; and an optical sensor 115 including a light emitter 113 for emitting light toward the rotating plate 112 and a light receiver 114 for receiving light passing through the slits 111 of the rotating plate 112. Preferably, the detecting unit 10 is installed at the front in a direction that the cleaner body 1 travels on the basis of the suction head 6 in order to cope with a height between a bottom of the cleaner body 1 and a floor by measuring them.

Meanwhile, a battery 21 is installed in the cleaner body 1. A charging terminal unit 23 is provided at a rear surface of the body 1 and includes a charging terminal 22 connected to a connection terminal 26 of a power terminal unit 25 installed on a wall surface 24 of a room, for charging the battery 21. In addition, a light-emitting unit 41 is installed at the lower side of the power terminal unit 25 and emits an optical signal for inducing a cleaner body 1 toward a power terminal unit 25, and a light-receiving unit 42 is installed at a lower side of the charging terminal unit 23 and receives an optical signal emitted from the light-emitting unit 41.

When a user operates a robot cleaner in accordance with the present invention constructed as above, the control unit 11 and the navigation sensor 30 are operated, and a driving wheel 8 connected to the driving motor 51 is rotated. Thusly, the robot cleaner travels a cleaning zone along a set pattern, and simultaneously, the fan motor 2 is driven. Accordingly, the cleaning is made by sucking dirt on a floor to the filter 3 through the suction head 6 and the connection pipe 5 and filtering the sucked dirt.

Figure 5:
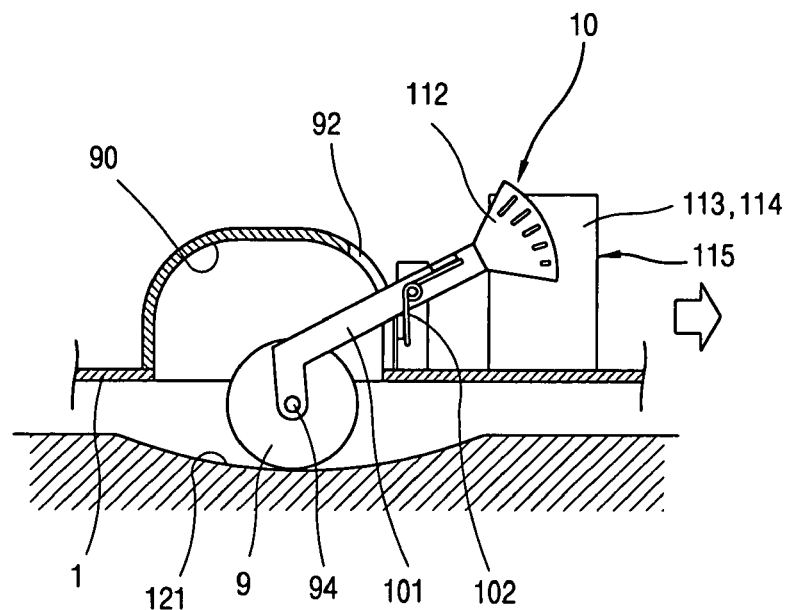
FIGS. 5 and 6 are views showing operational states of a detecting unit provided in a robot cleaner in accordance with the present invention.
Figure 6:
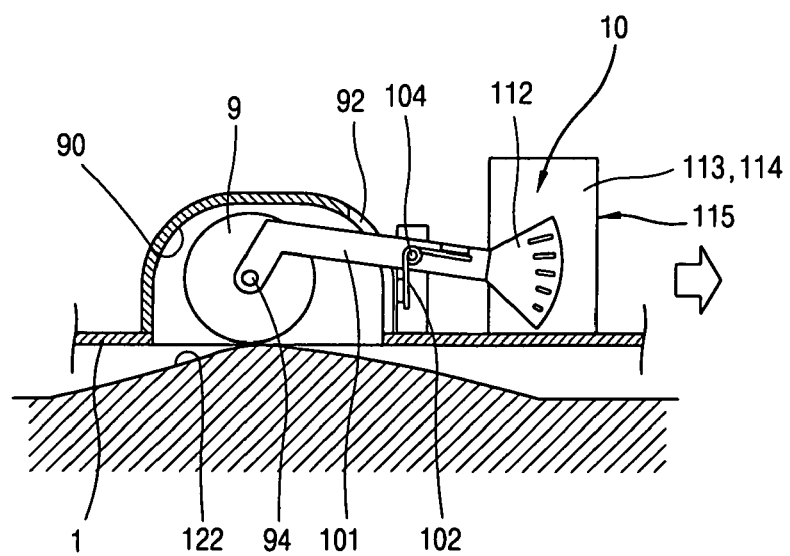

As shown in FIGS. 5 and 6, when the cleaner body 1 carries out the cleaning operation and travels a concaved portion 121 or a convexed portion 122, since the cleaner body 1, particularly the suction head 6, is not moved along a curved surface of the concaved portion 121 or the convexed portion 122, but is always moved in a state of maintaining its horizontal state. Accordingly, a height between the bottom of the cleaner body 1 and the floor is changed. Therefore, the height between the bottom of the cleaner body 1 and the floor is measured by the detecting unit 10, and a suction force is variously applied in accordance with the respective portion.

That is, as shown in FIG. 5, when the cleaner travels a concaved portion 121 lower than a level ground, the auxiliary wheel 9 is pushed downwardly by an elastic force of the elastic member 102 or a self-weight of the auxiliary wheel 9. Accordingly, the connecting link 101 and the rotating plate 112 are rotated centering on the pivot shaft 104 (counterclockwise in FIG. 5), the amount of displacement of the rotating plate 112 is sensed by the optical sensor 115. And, the amount of displacement of the rotating plate 112, sensed by the optical sensor 115 is inputted to the control unit 11, and the control unit 11 increases a rotation force of the fan motor 2 according to the inputted value, to thereby increase a suction force, so that dirt on the concaved portion 121 can be sucked.

In addition, as shown in FIG. 6, when the cleaner travels the convexed portion 122, the auxiliary wheel 9 is pushed upwardly by the convexed portion 122. Accordingly, the connecting link 101 and the rotating plate 112 are rotated centering on the pivot shaft 104 (clockwise in FIG. 6), and the amount of displacement of the rotating plate 112 is sensed by the optical sensor 115. And, the amount of displacement of the rotating plate 112, sensed by the optical sensor 115 is inputted to the control unit 11, and the control unit 11 decreases a rotation force of the fan motor 2 according to the inputted value, so that dirt is sucked with a relatively small suction force.

Figure 7:
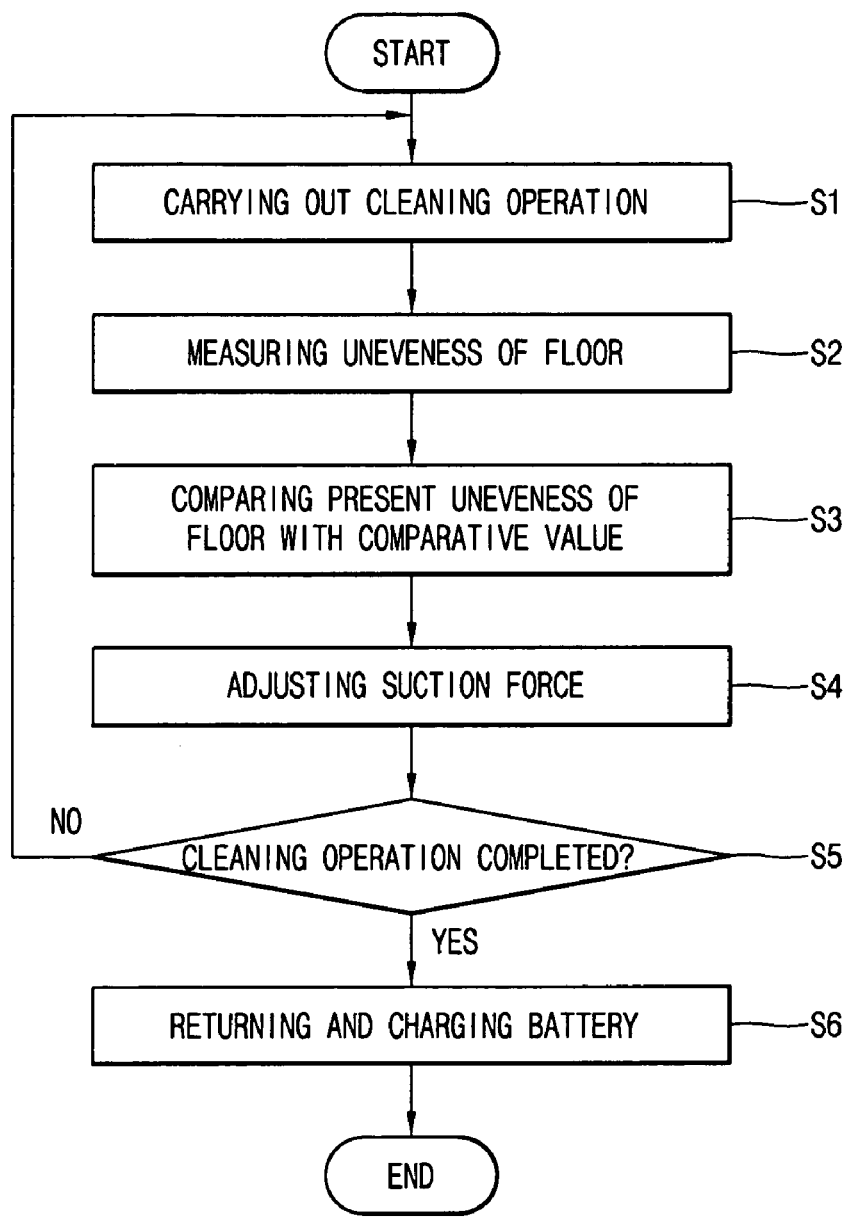
FIG. 7 is a flow chart sequentially showing operation of a robot cleaner in accordance with the present invention.

Hereinafter, operations of the robot cleaner in accordance with the present invention will now be described with reference to FIG. 7. The letter 'S' in the drawing means each step.

First, when a user operates a switch of a cleaner, the cleaner moves in a cleaning zone according to the preset pattern, and performs a cleaning operation (S1).

When the cleaner travels an uneven portion of a floor while carrying out cleaning operation in the cleaning zone, the detecting unit 10 senses the amount of vertical displacement of the auxiliary wheel 9 (S2). That is, the light-receiving unit 114 measures how much light emitted by the light-emitting unit 113 of the optical sensor 115 passes through slits formed at the rotating plate, and its resulting value is outputted to the control unit 11.

And, the control unit 11 performs an operation of comparing the measured value of vertical displacement of the auxiliary wheel 9 and a preset reference value (S3).

After the amount of vertical displacement of the auxiliary wheel 9 and a preset reference value have been compared, if it is determined that the cleaner travels a concaved portion 121 lower than a level ground, a rotation force of the fan motor 2 is increased, thereby increasing a suction force for sucking dirt. If it is determined that the cleaner travels a convexed portion 122 higher than a level ground, a rotation force of the fan motor 2 is decreased, thereby decreasing a suction force for sucking dirt. In addition, If the floor is even, or unevenness of the floor is very small, the suction force is adjusted to a suction force set in an early stage (S4).

Then, the control unit 11 determines whether a cleaning operation of a cleaner has been completed (S5). And, if the cleaning operation has not been completed, cleaning is performed again. If the cleaning operation has been completed, the cleaner returns to the power terminal unit 25, and the battery 21 is charged (S6).

As so far described, the robot cleaner in accordance with the present invention senses the unevenness of the floor, and variously controls a suction force thereof, thus cleaning efficiency can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A robot cleaner comprising:
    a suction device installed within a cleaner body, the suction device sucking dirt on a floor;
    a driver that moves the cleaner body;
    a detector mounted at the cleaner body, the detector detecting a height between a bottom of the cleaner body and the floor; and
    a controller that controls the suction device in response to signal a from the detector, the controller adjusting a suction force of the suction device in accordance with the height between the bottom of the cleaner body and the floor.

2. The robot cleaner of claim 1, wherein the detector comprises:
    a wheel installed at a bottom of the cleaner body to be contacted with the floor, and displaced in a vertical direction according to unevenness of the floor; and
    a sensor that senses the amount of vertical displacement of the wheel.

3. The robot cleaner of claim 2, wherein the sensor comprises:
    a connecting link hingedly connected to a rotational shaft of the wheel and pivotally connected to a pivot shaft fixed at the cleaner body in order to be rotated centering on the pivot shaft by vertical displacement of the wheel;
    a rotating plate installed at one end of the connecting link and having a plurality of slits formed in a direction that the connecting link is rotated; and
    an optical sensor including a light emitter that emits light to the rotating plate and a light receiver that receives light passing through the slits of the rotating plate.

4. The robot cleaner of claim 3, wherein an elastic member is installed at the connecting link, of which one end is fixed to a casing of the cleaner body and provides an elastic force to the connecting link.

5. The robot cleaner of claim 1, wherein the detector is installed at a front in a direction that the cleaner body moves on the basis of a suction head of the suction device.

6. A robot cleaner comprising:
    a suction device provided at a cleaner body, the suction device sucking dirt on a floor;
    a driving wheel installed at the cleaner body and rotated by a driving motor to move the cleaner body;
    at least one auxiliary wheel installed at a bottom of the cleaner body, supporting the cleaner body on a floor in a state of being in contact with the floor, and rotated by movement of the cleaner body; and
    a detector that senses an amount of vertical displacement of the auxiliary wheel,
    wherein the detector comprises:
    a connecting link hingedly connected to a rotational shaft of the auxiliary wheel and pivotally connected to the cleaner body in order to be rotated according to unevenness of the floor; and
    a sensor that senses the amount of rotation of the connecting link.

7. The robot cleaner of claim 6, wherein the sensing unit comprises:
    a rotating plate installed at one end of the connecting link and having a plurality of slits; and
    an optical sensor including a light emitter that emits light and a light receiver that receives light passing through the slits of the rotating plate.

8. The robot cleaner of claim 6, wherein the detector is installed at a front in a direction that the cleaner body travels on the basis of a suction head of the suction device.

9. The robot cleaner of claim 6, further comprising an elastic member that applies an elastic force to the auxiliary wheel.

10. An operating method of a robot cleaner comprising:
    placing the robot cleaner on a floor;
    carrying out cleaning operation by moving by itself and sucking dirt on the floor;
    detecting a height between a bottom of the cleaner and the floor; and
    controlling a suction force that sucks dirt on the floor in accordance with the height between the bottom of the cleaner and the floor.

11. The method of claim 10, wherein the detecting is performed by measuring a vertical displacement of a wheel that is installed at a bottom of the cleaner, rotated by movement of the cleaner, and displaced in a vertical direction according to unevenness of the floor.

12. The method of claim 10, wherein the controlling is performed by increasing a suction force when the height between the bottom of the cleaner and the floor is increased, and decreasing a suction force when the height between the bottom of the cleaner and the floor is decreased.

* * * * *